(12) United States Patent
Iizuka

(10) Patent No.: US 6,563,847 B1
(45) Date of Patent: May 13, 2003

(54) LASER OPTICAL SYSTEM

(75) Inventor: Takashi Iizuka, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 17 days.

(21) Appl. No.: 09/669,754

(22) Filed: Sep. 26, 2000

(30) Foreign Application Priority Data

Sep. 29, 1999 (JP) ........................................ 11-276507

(51) Int. Cl.$^7$ ................................................ H01S 3/13
(52) U.S. Cl. ........................ 372/31; 359/204; 359/205
(58) Field of Search ........................... 372/31; 359/204, 359/205

(56) References Cited

U.S. PATENT DOCUMENTS

| | | | | |
|---|---|---|---|---|
| 4,821,113 A | * | 4/1989 | McQuade et al. | ............. 358/75 |
| 6,055,084 A | * | 4/2000 | Shiraishi et al. | ............. 359/204 |
| 6,222,961 B1 | * | 4/2001 | Engelhardt et al. | ............ 385/31 |
| 6,268,969 B1 | * | 7/2001 | Ogawa | ........................ 359/745 |
| 6,275,342 B1 | * | 8/2001 | Sakamoto et al. | ........... 359/691 |

* cited by examiner

Primary Examiner—Paul Ip
Assistant Examiner—Leith Al-Nazer
(74) Attorney, Agent, or Firm—Greenblum & Bernstein, P.L.C.

(57) ABSTRACT

Disclosed is a laser optical system including a multiline laser source that emits a laser beam having a plurality of peak wavelengths, an imaging optical system that converges the laser beam emitted from the multiline laser source to form beam spots of respective peak wavelengths on an object surface, and a correcting optical system that makes beam spots have the same diameter for at least two selected peak wavelengths. The correcting optical system adjusts a diameter of a laser beam incident on the imaging optical system such that the diameter of the incident laser beam becomes smaller as the wavelength of laser beam becomes shorter. The correcting optical system satisfies the following condition (1):

$$\sqrt{\frac{\lambda_A}{\lambda_B}} < \frac{\omega'_A}{\omega'_B} < \left(\sqrt{\frac{\lambda_A}{\lambda_B}}\right)^3 \qquad (1)$$

where $\lambda_A$ and $\lambda_B$ are the selected peak wavelengths and $\omega'_A$ and $\omega'_B$ are diameters of the laser beam to be incident on the imaging optical system at the selected peak wavelengths $\lambda_A$ and $\lambda_B$.

20 Claims, 2 Drawing Sheets

LASER OPTICAL SYSTEM

BACKGROUND OF THE INVENTION

The present invention relates to a laser optical system such as to be employed in a laser photo plotter, and more particularly to a laser optical system including a laser source that emits a laser beam having a plurality of wavelengths (i.e., a multiline laser).

The exposure device such as a laser photo plotter, which requires relatively large laser power, employs a gas laser. A laser beam emitted from a gas laser is deflected by a polygon mirror and is converged through an imaging optical system such as an fθ lens to form a beam spot on an object surface to be exposed. The beam spot scans the object surface to form a scanning line as the polygon mirror rotates.

A gas laser generally emits a laser beam having a plurality of peak wavelengths. For example, an argon laser emits a laser beam having a plurality of peak wavelengths in ultraviolet and visible regions.

In order to keep high energy efficiency, it is desirable to use a plurality of peak wavelengths of a laser beam emitted from a gas laser.

However, since the minimum diameter of a beam spot on the object surface is proportional to a wavelength and is inversely proportional to a beam diameter incident on an imaging optical system, the beam spots formed by the different wavelengths are different in diameter when beam diameters incident on the imaging optical system are identical to one another.

Therefore, when the laser beam emitted from a multiline laser source is divided into a plurality of wavelengths and the divided beams form respective beam spots at different points to form a plurality of scanning lines per one scan, the widths of scanning lines become different depending on the wavelength. Further, when the beam spots of the respective wavelengths are formed at the same point on the object surface, a distribution of light quantity within the beam spot becomes irregular. In either case, a quality of an image formed on the object surface is degraded.

SUMMARY OF THE INVENTION

It is therefore an object of the present invention to provide a laser optical system capable of making the beam spots have the same diameter when the laser beam having different wavelengths is used to form the beam spots on the object surface.

For the above object, according to the present invention, there is provided an improved laser optical system, which includes a correcting optical system that adjusts a diameter of a laser beam incident on an imaging optical system such that the diameter of the incident laser beam decreases as the wavelength of laser beam becomes shorter.

Namely, the laser optical system of the invention includes a multiline laser source that emits a laser beam having a plurality of peak wavelengths, an imaging optical system that converges the laser beam emitted from the multiline laser source to form beam spots of respective peak wavelengths on an object surface, and the correcting optical system that makes.beam spots have the same diameter for at least two selected peak wavelengths.

The correcting optical system satisfies the following condition (1):

$$\sqrt{\frac{\lambda_A}{\lambda_B}} < \frac{\omega'_A}{\omega'_B} < \left(\sqrt{\frac{\lambda_A}{\lambda_B}}\right)^3 \quad (1)$$

where $\lambda_A$ and $\lambda_B$ are the selected peak wavelengths and $\omega'_A$ and $\omega'_B$ are diameters of the laser beam to be incident on the imaging optical system at the selected peak wavelengths $\lambda_A$ and $\lambda_B$.

Further, it is preferable that the correcting optical system satisfies the following condition (2):

$$\frac{\omega'_A}{\omega'_B} = \frac{\lambda_A}{\lambda_B}. \quad (2)$$

In the specification, a "beam spot" means a spot formed on the object surface by each wavelength. A laser beam having plurality of wavelengths forms a plurality of beam spots at the same point or different points.

With the above described construction, since the correcting optical system adjusts the beam diameters of the respective wavelengths, the diameters of the beam spots formed on the object surface can be the same in spite of the wavelength. When at least the condition (1) is satisfied, a difference in the spot diameters becomes insignificant in practical use. Further, when the condition (2) is satisfied, the spot diameters will be completely identical.

In order to give the above described characteristics to the correcting optical system, it is preferable to satisfy the condition (3):

$$\sqrt{\frac{\lambda_A}{\lambda_B}} < \frac{m_A}{m_B} < \left(\sqrt{\frac{\lambda_A}{\lambda_B}}\right)^3 \quad (3)$$

where $m_A$ and $m_B$ are magnifications of the correcting optical system at the selected peak wavelengths $\lambda_A$ and $\lambda_B$.

Further, it is preferable that the correcting optical system satisfies the following condition (4):

$$\frac{m_A}{m_B} = \frac{\lambda_A}{\lambda_B}. \quad (4)$$

There are two ways to vary the magnifications in accordance with the wavelength.

In the first way, when the laser beam emitted from a multiline laser source is divided into a plurality of monochromatic beams, the correcting optical system comprises a plurality of optical elements that are disposed in optical paths of the respective monochromatic beams. The optical elements are different in a focal length such that the magnifications for the respective monochromatic beams are different from one another.

In the second way, when the laser beam having different wavelengths forms a single beam spot, the correcting optical system is arranged in the common optical path to cause chromatic aberration such that magnifications for the respective wavelengths are different from one another. In the second way, it is preferable that the correcting optical system is provided with a diffraction surface.

When the laser optical system of the invention is applied to a scanning optical system such as a laser photo plotter, a polygon mirror is arranged between the correcting optical system and the imaging optical system to deflect an incident beam.

DESCRIPTION OF THE ACCOMPANYING DRAWINGS

DESCRIPTION OF THE EMBODIMENTS

Figure 1:
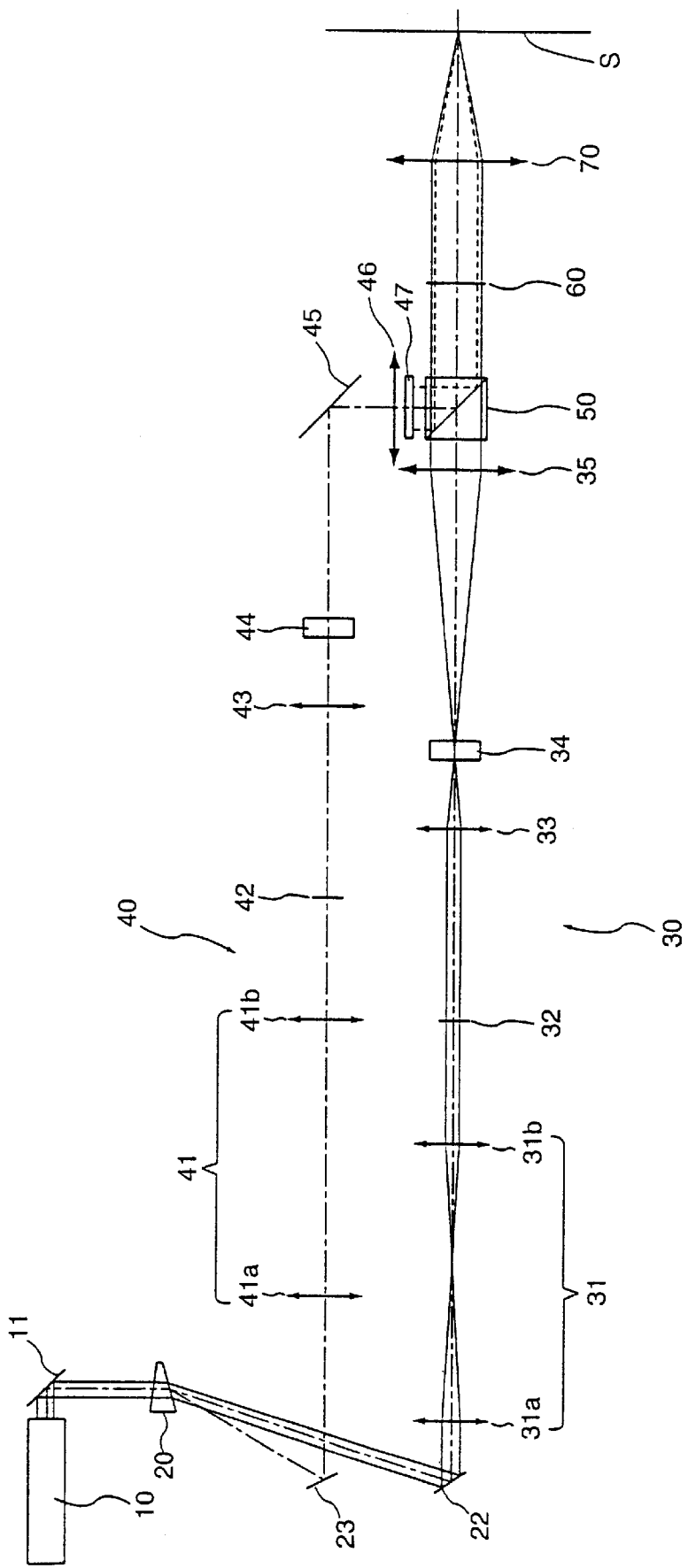
FIG. 1 shows an entire optical system of a scanning optical system to which a laser optical system of a first embodiment is applied.
Figure 2:
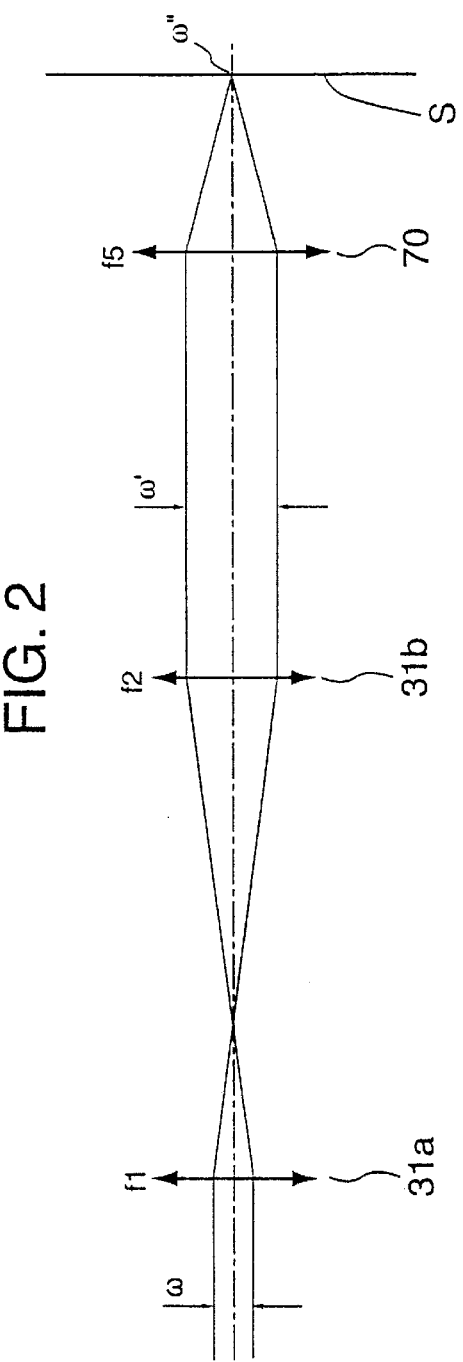
FIG. 2 shows an enlarged view of apart of the scanning optical system of FIG. 1.

The laser optical systems embodying the invention will be described with reference to the drawings. FIG. 1 shows a scanning optical system to which a first embodiment is applied, FIG. 2 is an enlarged view of a part of FIG. 1.

The scanning optical system of the first embodiment includes, as shown in FIG. 1, a multiline laser source 10 that emits a laser beam having a plurality of peak wavelengths, a wavelength separating prism 20 that separates the laser beam emitted from the laser source 10 into a plurality of monochromatic beams of different wavelengths (first and second monochromatic beams in this embodiment), a pair of modulating optical systems 30 and 40 that modulate intensities of the respective monochromatic beams, a polarizing beam splitter 50 as a beam combining optical system that combines the monochromatic beams modulated by the modulating optical systems 30 and 40, a polygon mirror 60 that deflects a plurality of combined laser beams, and an fθ lens 70 as an imaging optical system that converges the laser beams deflected by the deflector 60 to form beam spots on an object surface S to be exposed.

The laser source 10 is an argon laser that emits a laser beam having a plurality of peak wavelengths. The wavelength of the first monochromatic beam is 514.5 nm and the wavelength of the second monochromatic beam is 488 nm, in this example. The laser beam emitted from the laser source 10 and reflected by a mirror 11 is spatially separated into two monochromatic beams by means of a chromatic dispersion of the wavelength separating prism 20.

The first monochromatic beam of the longer wavelength is refracted at a predetermined refraction angle by the wedge-shaped wavelength separating prism 20 and reflected by a mirror 22 to be incident on the first modulating optical system 30. On the other hand, the second monochromatic beam of the shorter wavelength is refracted at a larger refraction angle than that of the first monochromatic beam by the prism 20 and reflected by a mirror 23 to be incident on the second modulating optical system 40.

The first modulating optical system 30 is provided with a relay lens system 31 consisting of a pair of positive lenses 31a and 31b, a piezo mirror 32 for compensating facet error of the polygon mirror 60, a condenser lens 33, an acoustooptic modulator (AOM) 34 that modulates intensity of the laser beam, and a collimator lens 35, arranged in this order from the mirror 22. The piezo mirror 32 is illustrated as a transmitting element like a lens in FIG. 1 for a purpose of illustration.

The first monochromatic beam reflected by the mirror 22 is adjusted in its diameter by the relay lens system 31, and the adjusted beam is condensed by the condenser lens 33 onto the channel of the AOM 34 to be modulated. The channel is substantially located in the rear focal plane of the condenser lens 33.

The modulated divergent beam is collimated by the collimator lens 35 and incident on the polarizing beam splitter 50. The optical system from the laser source 10 to the first modulating optical system 30 is designed such that the emergent beam from the first modulating optical system 30 is incident on the polarizing beam splitter 50 as P-polarized light. Therefore, the laser beam emerged from the first modulating optical system 30 passes through the polarizing beam splitter 50.

Like the first modulating optical system 30, the second modulating optical system 40 is provided with a relay lens system 41 consisting of a pair of positive lenses 41a and 41b, a piezo mirror 42 (illustrated as a transmitting element), a condenser lens 43, an AOM 44, a mirror 45, a collimator lens 46 and a half-wave plate 47, arranged in this order from the mirror 23.

The second monochromatic beam reflected by the mirror 23 is adjusted in its diameter by the relay lens system 41, and the adjusted beam is condensed by the condenser lens 43 onto the channel of the AOM 44 to be modulated. The channel is substantially located in the rear focal plane of the condenser lens 43.

The modulated divergent beam is reflected by the mirror 45 and collimated by the collimator lens 46 to be incident on the polarizing beam splitter 50 as S-polarized light through the half-wave plate 47. Therefore, the laser beam emerged from the second modulating optical system 40 is reflected by the polarizing beam splitter 50.

The polarizing beam splitter 50 allows the laser beam emerged from the first modulating optical system 30 to pass therethrough and reflects the laser beam emerged from the second modulating optical system 40 so as to combine the laser beams. The combined laser beams are simultaneously deflected by the polygon mirror 60 to form the beam spots on the object surface S through the fθ lens 70.

When the plotting speed is emphasized, the monochromatic laser beams of the first and second wavelengths form the respective beam spots at the different points on the object surface S. In such a case, the AOM's 34 and 44 are driven by individual control signals to form a pair of scanning lines per one scan. On the other hand, when the light quantity of the spot formed on the object surface S is emphasized, the monochromatic beams of the first and second wavelengths may form the respective beam spots at the same point on the object surface S. In such a case, the AOM's 34 and 44 are driven by the same control signal to form a single scanning line per one scan.

The first and second modulating optical systems 30 and 40 function as the correcting optical system that adjusts beam diameters of the first and second wavelengths incident on the fθ lens 70 so as to decrease the beam diameter as the wavelength of the incident beam becomes shorter.

If the optical performances of the first and second modulating optical systems 30 and 40 are precisely the same, the incident beams on the fθ lens 70 equal in the beam diameter to each other, which causes difference between the spot diameters on the object surface S. Thus, in the first embodiment, the focal lengths of the lenses in the relay lens systems 31 and 41 are determined to be different from each other. The difference in the focal length causes the difference in the magnification, which defines the difference in the diameters of the incident beams on the fθ lens 70. The difference in the focal length is determined such that the diameter of the incident beam on the fθ lens 70 decreases as the wavelength becomes shorter.

Next, the change of the diameter of the laser beam in the first modulating optical system 30 will be described with reference to FIG. 2. It should be noted that the condenser lens 33 and the collimator lens 35 are not illustrated in FIG. 2.

As shown in FIG. 2, the relationships among the beam diameter ο to be incident on the first lens 31a (focal length f1) of the relay optical system 31, the beam diameter ω exited from the second lens 31b (focal length f2) and the diameter ω" of the beam spot formed by the fθ lens 70 (focal length f5) on the object surface S are expressed by the following equations:

$$\omega' = \frac{|f2|}{|f1|} \times \omega$$

$$\omega'' = \frac{4\lambda |f5|}{\pi \omega'}$$

where λ is a wavelength of the incident laser beam.

Thus, when the beam diameters $\omega'_A$ and $\omega'_B$ of the respective wavelengths $\lambda_A$ and $\lambda_B$ to be incident on the fθ lens 70 satisfy the following condition (2), the beam spot diameters $\omega''_A$ and $\omega''_B$ of the respective wavelengths $\lambda_A$ and $\lambda_B$ are the same on the object surface S.

$$\frac{\omega'_A}{\omega'_B} = \frac{\lambda_A}{\lambda_B} \quad (2)$$

Further, when the following condition (1) is satisfied, the difference of the beam spot diameter on the object surface can be reduced within an acceptable level regarding the image forming quality.

$$\sqrt{\frac{\lambda_A}{\lambda_B}} < \frac{\omega'_A}{\omega'_B} < \left(\sqrt{\frac{\lambda_A}{\lambda_B}}\right)^3 \quad (1)$$

In order to satisfy the condition (2), magnifications $m_A$ and $m_B$ of the modulating optical systems 30 and 40 for the wavelengths $\lambda_A$ and $\lambda_B$ should satisfy the following condition (4).

$$\frac{m_A}{m_B} = \frac{\lambda_A}{\lambda_B} \quad (4)$$

That is, when the condition (4) is satisfied, the beam spot diameters $\omega''_A$ and $\omega''_B$ of the respective wavelengths $\lambda_A$ and $\lambda_B$ are the same on the object surface S.

Further, when the following condition (3) is satisfied, the difference of the beam spot diameter on the object surface can be reduced within an acceptable level.

$$\sqrt{\frac{\lambda_A}{\lambda_B}} < \frac{m_A}{m_B} < \left(\sqrt{\frac{\lambda_A}{\lambda_B}}\right)^3 \quad (3)$$

In the first embodiment, since $\lambda_A$ is equal to 514.5 nm and $\lambda_B$ is equal to 488 nm, the respective conditions (1) through (4) are embodied as follows.

| | |
|---|---|
| $1.027 < \omega'_A/\omega'_B < 1.083$ | Condition (1) |
| $\omega'_A/\omega'_B = 1.054$ | Condition (2) |
| $1.027 < m_A/m_B < 1.083$ | Condition (3) |
| $m_A/m_B = 1.054$ | Condition (4) |

In the first embodiment, in order to satisfy the above conditions, the focal length of second lenses 31b and 41b of the relay optical systems 31 and 41 are set to different values. Constructions of the modulating optical systems 30 and 40 are shown in TABLE 1. In TABLE 1, f1 denotes a focal length of the first lens 31a (41a) of the relay optical system 31 (41), f2 denotes a focal length of the second lens 31b (41b), f3 denotes a focal length of the condenser lens 33 (43), f4 denotes a focal length of the collimator lens 35 (46), and f5 denotes a focal length of the fθ lens 70.

TABLE 1

| | First modulating system 30 | Second modulating system 40 |
|---|---|---|
| ω | 1.5 mm | 1.5 mm |
| f1 | 300 mm | 300 mm |
| f2 | 253 mm | 240 mm |
| f3 | 120 mm | 120 mm |
| f4 | 1800 mm | 1800 mm |
| m | 12.65 times | 12.00 times |
| ω' | 18.975 mm | 18.000 mm |
| f5 | 720 mm | |
| ω" | 24.9 μm | 24.9 mm |

With the construction of TABLE 1, since the conditions (2) and (4) are satisfied, i.e., $\omega'_A/\omega'_B = m_A/m_B = 1.054$, the spot diameters ω" on the object surface S are the same. Alternatively, if the focal length of the second lens 31b of the relay lens system 31 in the first modulating optical system 30 is 240 mm, which is the same value as the counterpart of the second modulating optical system 40, the spot diameter ω" of the laser beam passing through the first modulating optical system 30 becomes 26.2 μm, a difference of about 5 percent occurs.

Second Embodiment

Figure 3:
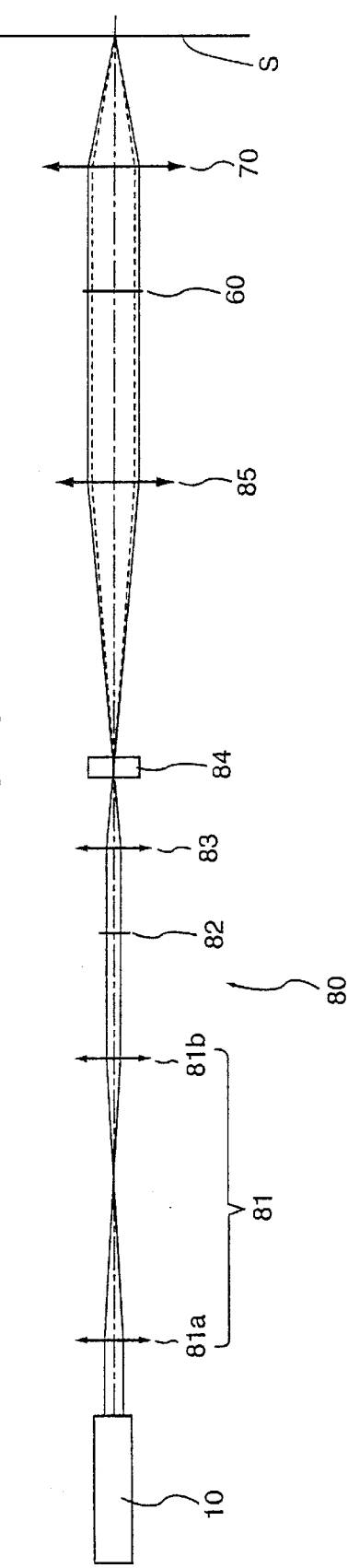
FIG. 3 shows an entire optical system of a scanning optical system to which a laser optical system of a second embodiment is applied.

FIG. 3 shows a scanning optical system to which the second embodiment is applied. In the scanning optical system of the second embodiment, a laser beam emitted from a multiline laser source 10 is modulated through a modulating optical system 80, and is deflected by a polygon mirror 60. The deflected beam is converged by an fθ lens 70 to form beam spots on an object surface S.

The modulating optical system 80 has a relay optical system 81 that consists of a pair of positive (concave) mirrors 81a and 81b, a piezo mirror 82 that compensates a facet error of the polygon mirror 60, a condenser lens 83, an AOM 84 and a collimator lens 85, that are arranged in this order from the side of the laser source 10. It should be noted that the first and second positive mirrors 81a, 81b and the piezo mirror 82 are illustrated as transmitting elements in FIG. 3 for a purpose of illustration.

In the second embodiment, a first wavelength 363.8 nm and a second wavelength 351.1 nm are selected to use among a plurality of peak wavelengths of the multiline laser source 10. A laser beam emitted from the laser source 10 is adjusted in its diameter through the relay optical system 81, and is converged by the condenser lens 83. The convergent laser beam is incident on the AOM 84 that is located on the rear focal point of the condenser lens 83 and is modulated. The modulated and divergent beam is collimated by the collimator lens 85, and is deflected by the polygon mirror 60. The deflected beam reaches the object surface S passing through the fθ lens 70.

The modulating optical system 80 functions as a correcting optical system that adjusts beam diameters of respective wavelength to be incident on the fθ lens 70 as the imaging optical system. The modulating optical system 80 adjusts the beam diameters so as to decrease the beam diameter as the wavelength of the incident beam becomes shorter. The correcting optical system of the second embodiment is located in a common optical path of the two wavelengths and has a chromatic aberration such that the magnification varies in accordance with the wavelength.

In the second embodiment, since $\lambda_A$ is equal to 363.8 nm and $\lambda_B$ is equal to 351.1 nm, the respective conditions (1) through (4) are embodied as follows.

$1.018 < \omega'_A/\omega'_B < 1.055$      Condition (1)

$\omega'_A/\omega'_B = 1.036$      Condition (2)

$1.018 < m_A/m_B < 1.055$      Condition (3)

$m_A/m_B = 1.036$      Condition (4)

Thus, in the second embodiment, in order to satisfy the above conditions, the first and second positive mirrors 81a and 81b of the relay lens system 81 have chromatic aberration such that the focal lengths thereof vary in accordance with the wavelength.

Constructions of the modulating optical system 80 are shown in TABLE 2. In TABLE 2, f1 denotes a focal length of the first positive mirror 81a of the relay optical system 81, f2 denotes a focal length of the second positive mirror 81b, f3 denotes a focal length of the condenser lens 83, f4 denotes a focal length of the collimator lens 85, and f5 denotes a focal length of the fθ lens 70.

TABLE 2

|     | Wavelength 363.8 nm | Wavelength 351.1 nm |
| --- | --- | --- |
| ω   | 1.2 mm | 1.2 mm |
| f1  | 240.00 mm | 244.30 mm |
| f2  | 240.00 mm | 235.70 mm |
| f3  | 180 mm | 180 mm |
| f4  | 900 mm | 900 mm |
| m   | 5.00 times | 4.824 times |
| ω'  | 6.00 mm | 5.79 mm |
| f5  | 720 mm | |
| ω"  | 18.5 μm | 18.5 μm |

With the construction of TABLE 2, since the conditions (2) and (4) are satisfied, i.e., $\omega'_A/\omega'_B = m_A/m_B = 1.036$, the spot diameters ω" on the object surface S are the same. In addition, since the first and second positive mirrors 81a and 81b do not cause chromatic aberration, diffraction gratings are provided to cause intended chromatic aberration. That is, the first positive mirror 81a consists of the reflection surface whose focal length is 480 mm and the diffraction grating whose focal length is 480 mm. In the same manner, the second positive mirror 81b consists of the reflection surface whose focal length is 160 mm and the diffraction grating whose focal length is −480 mm. As a result of these combinations, the focal length of the first positive mirror 81a varies −3.4 mm as the wavelength varies by +10 nm, and the focal length of the second positive mirror 81b varies +3.4 mm as the wavelength varies by +10 nm, which causes the wavelength dependence as shown in TABLE 2.

As described above, since the correcting optical system of the invention has the wavelength dependence such that the diameter of the beam incident on the imaging optical system decreases as the wavelength thereof becomes shorter, the diameters of the beam spots formed on the object surface can be kept constant.

Therefore, when a plurality of monochromatic beams form respective beam spots on the object surface at different points, the widths of the scanning lines become the same. Further, when the laser beam having a plurality of wavelengths forms beam spots at the same point, an irregular distribution of the light quantity within a beam spot can be prevented. In either case, a high quality of an image formed on the object surface can be achieved.

The present disclosure relates to the subject matter contained in Japanese Patent Application No. HEI 11-276507, filed on Sep. 29, 1999, which is expressly incorporated herein by reference in its entirety.

What is claimed is:

1. A laser optical system, comprising:

a multiline laser source that emits a laser beam having a plurality of peak wavelengths, each peak wavelength having a beam diameter as emitted;

an imaging optical system that converges said laser beam emitted from said multiline laser source to form beam spots of respective peak wavelengths or an object surface; and a correcting optical system that adjusts the magnification of the beam diameters of respective peak wavelengths in accordance with the magnitude of the respective peak wavelengths, before said laser beam is incident on said imaging optical system, so as to make the imaging optical system form beam spots of substantially the same diameter for at least two selected peak wavelengths, wherein said correcting optical system satisfies the following condition (1):

$$\sqrt{\frac{\lambda_A}{\lambda_B}} < \frac{\omega'_A}{\omega'_B} < \left(\sqrt{\frac{\lambda_A}{\lambda_B}}\right)^3 \quad (1)$$

where $\lambda_A$ and $\lambda_B$ are said selected peak wavelengths and $\omega'_A$ and $\omega'_B$ are diameters of said peak wavelengths of said laser beam as the peak wavelengths are incident on said imaging optical system at said selected peak wavelengths $\lambda_A$ and $\lambda_B$, wherein the ratio $\omega'_A/\omega'_B$ of the diameters of said selected peak wavelengths is a predetermined diameter ratio defines the adjustment of the magnification of the beam diameters before said laser beam is incident on said imaging optical system, and the square root of the ratio of the two selected peak wavelengths defines a lower acceptable level of beam spot difference as formed by the imaging optical system, while the cubed square root of the ratio of the two selected peak wavelengths defines an upper acceptable level of beam spot difference as formed by the imaging optical system.

2. The laser optical system according to claim 1, wherein said correcting optical system further satisfies the following condition (2):

$$\frac{\omega'_A}{\omega'_B} = \frac{\lambda_A}{\lambda_B}. \quad (2)$$

3. The laser optical system according to claim 1, wherein said correcting optical system satisfies the following condition (3):

$$\sqrt{\frac{\lambda_A}{\lambda_B}} < \frac{m_A}{m_B} < \left(\sqrt{\frac{\lambda_A}{\lambda_B}}\right)^3 \qquad (3)$$

where $m_A$ and $m_B$ are magnifications of said correcting optical system at said selected peak wavelengths $\lambda_A$ and $\lambda_B$.

4. The laser optical system according to claim 3, wherein said correcting optical system further satisfies the following condition (4):

$$\frac{m_A}{m_B} = \frac{\lambda_A}{\lambda_B}. \qquad (4)$$

5. The laser optical system according to claim 1, further comprising:
a wavelength separating element that separates the laser beam emitted from said multiline laser source into a plurality of monochromatic beams; and
a beam combining optical system that combines said monochromatic beams to be incident on said imaging optical system,
wherein said correcting optical system comprises a plurality of optical elements that are disposed in optical paths of said monochromatic beams, respectively, and
wherein said optical elements are different in a focal length such that relative magnifications for the respective monochromatic beams are different from one another.

6. The laser optical system according to claim 1, wherein said correcting optical system causes chromatic aberration such that magnifications for respective wavelengths are different from one another.

7. The laser optical system according to claim 6, wherein said correcting optical system has at least one diffraction surface.

8. The laser optical system according to claim 1, further comprising a polygon mirror that is arranged between said correcting optical system and said imaging optical system to deflect an incident beam.

9. The laser optical system according to claim 1, wherein said laser beam having a plurality of wavelengths forms a plurality of beam spots at the different points on said object surface.

10. The laser optical system according to claim 1, wherein said laser beam having a plurality of wavelengths forms a plurality of beam spots at the same point on said object surface.

11. A laser optical system, comprising:
a multiline laser source that emits a laser beam having a plurality of peak wavelengths;
an imaging optical system that converges said laser beam emitted from said multiline laser source to form beam spots of respective peak wavelengths on an object surface; and
a correcting optical system that adjusts beam diameters of respective wavelength to be incident on said imaging optical system,
wherein said correcting optical system adjusts the beam diameters before said laser beam is incident on said imaging optical system so as to decrease the beam diameter as the wavelength of the incident beam becomes shorter, to correct for variation in beam diameters of respective wavelengths caused by said imaging optical system.

12. A laser optical system, comprising:
a multiline laser source that emits a laser beam having a plurality of peak wavelengths, each peak wavelength having a beam diameter as emitted;
an imaging optical system that converges said laser beam emitted from said multiline laser source to form beam spots of respective peak wavelengths on an object surface; and
a correcting optical system that adjusts the magnification of the beam diameters of respective peak wavelengths in accordance with the magnitude of the respective peak wavelengths, before said laser beam is incident on said imaging optical system, so as to make the imaging optical system form beam spots of substantially the same diameter for at least two selected peak wavelengths,
wherein, a wavelength ratio being defined as a first respective peak wavelength over a second respective peak wavelengths, and a diameter ratio being defined as a beam diameter of said first respective peak wavelength over a beam diameter of said second respective peak wavelength as said laser beam is incident on said imaging optical system, said correcting optical system adjusting the first and second beam diameters of the respective peak wavelengths so that the diameter ratio is greater than (i) a lower acceptable level of beam spot difference as formed by the imaging optical system, the lower acceptable level being the square root of the wavelength ratio, and less than (ii) an upper acceptable level of beam spot difference as formed by the imaging optical system, the upper acceptable level being the cubed square root of the wavelength ratio.

13. The laser optical system according to claim 12, wherein said correcting optical system adjusts the first and second beam diameters of the respective peak wavelengths so that the diameter ratio is equal to the wavelength ratio.

14. The laser optical system according to claim 12, wherein a magnification ratio is defined as a magnification of said first respective peak wavelength by said correcting optical system over a magnification of said second respective peak wavelength by said correcting optical system, said correcting optical system magnifying the respective peak wavelengths so that the magnification ratio is greater than (i) the square root of the wavelength ratio, and less than (ii) the cubed square root of the wavelength ratio.

15. The laser optical system according to claim 14, wherein said correcting optical system magnifies the respective peak wavelengths so that the magnification ratio is equal to the wavelength ratio.

16. A laser optical system, comprising:
a multiline laser source that emits a laser beam having a plurality of peak wavelengths, each peak wavelength having a beam diameter as emitted;
a correcting optical system that varies beam diameters of each said peak wavelength in a predetermined diameter ratio; and
an imaging optical system that converges each said peak wavelength from said correcting optical system to form beam spots of each peak wavelength on an object surface, the amount of convergence being different for each said peak wavelength,
said predetermined diameter ratio of said correcting optical system being set to account for the different amount of convergence of each peak wavelength of at least said imaging optical system, so that the imaging optical system forms, for each peak wavelength, beam spots of substantially the same size on the object surface.

17. The laser optical system according to claim 16, said predetermined diameter ratio of said correcting optical system being set between the square root of the ratio of the two selected peak wavelengths and the cube of said square root of the ratio of the two selected peak wavelengths, so that the imaging optical system forms, for each peak wavelength, beam spots of substantially the same size on the object surface, said correcting optical system thereby satisfying the following condition (1):

$$\sqrt{\frac{\lambda_A}{\lambda_B}} < \frac{\omega'_A}{\omega'_B} < \left(\sqrt{\frac{\lambda_A}{\lambda_B}}\right)^3 \quad (1)$$

wherein the predetermined diameter ratio is the ratio $\omega'_A/\omega'_B$ of the diameters of said selected peak wavelengths as said laser beam is incident on said imaging optical system, and where $\lambda_A$ and $\lambda_B$ are said selected peak wavelengths.

18. A laser optical system, comprising:

a light source that emits a laser beam having a plurality of peak wavelengths;

an imaging optical system that converges the laser beam emitted by said light source to form beam spots of respective peak wavelengths on an object surface; and a correcting optical system arranged between said light source and said imaging optical system, said correcting optical system adjusting beam diameters of respective wavelengths to be incident on said imaging optical system such that beam spots formed on the object surface have substantially the same diameter so that variation in beam diameters of respective wavelengths caused by said imaging optical system is corrected.

19. The laser optical system according to claim 18, wherein a magnification ratio is defined as a magnification of said first respective peak wavelength by said correcting optical system over a magnification of said second respective peak wavelength by said correcting optical system, and a wavelength ratio is defined as the first respective peak wavelength over the second respective peak wavelength, and wherein beam spots formed on the object surface have substantially the same diameter when the magnification ratio is between (i) the square root of the wavelength ratio and (ii) the cubed square root of the wavelength ratio.

20. The laser optical system according to claim 19, wherein said correcting optical system adjusts beam diameters of respective wavelengths to be incident on said imaging optical system such that beam spots formed on the object surface have the same diameter so that variation in beam diameters of respective wavelengths caused by said imaging optical system is corrected, and wherein beam spots formed on the object surface have the same diameter when the magnification ratio is equal to the wavelength ratio.

* * * * *